United States Patent
Wei et al.

(10) Patent No.: US 10,006,705 B2
(45) Date of Patent: Jun. 26, 2018

(54) METHODS FOR TREATING TISSUE MATERIALS

(71) Applicant: Warsaw Orthopedic, Inc., Warsaw, IN (US)

(72) Inventors: Guobao Wei, Milltown, NJ (US); David R. Kaes, Toms River, NJ (US); Susan J. Drapeau, Collierville, TN (US); Subhabrata Bhattacharyya, Metuchen, NJ (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 476 days.

(21) Appl. No.: 14/617,170

(22) Filed: Feb. 9, 2015

(65) Prior Publication Data

US 2016/0231056 A1    Aug. 11, 2016

(51) Int. Cl.
*F26B 5/04*    (2006.01)
*A21C 9/08*    (2006.01)

(52) U.S. Cl.
CPC ............... *F26B 5/04* (2013.01); *A21C 9/083* (2013.01)

(58) Field of Classification Search
CPC ............ A61K 2236/37; A61K 2236/35; A61K 2236/333
USPC ......................................... 34/415, 558, 413
See application file for complete search history.

(56) References Cited

U.S. PATENT DOCUMENTS

| | | |
|---|---|---|
| 4,646,795 A | 3/1987 | Hebron et al. |
| 5,202,021 A | 4/1993 | Griffin et al. |
| 5,353,531 A | 10/1994 | Doucette |
| 5,716,087 A | 2/1998 | Backich et al. |
| 5,738,399 A | 4/1998 | Mitchell |
| 6,294,187 B1 | 9/2001 | Boyce et al. |
| 6,440,444 B2 | 8/2002 | Boyce et al. |
| 6,478,825 B1 | 11/2002 | Winterbottom et al. |
| 6,696,073 B2 | 2/2004 | Boyce et al. |
| 6,723,131 B2 | 4/2004 | Muschler |
| 7,083,648 B2 | 8/2006 | Yu et al. |
| 7,097,027 B1 | 8/2006 | Chen |
| 7,191,553 B2 | 3/2007 | Doucette et al. |
| 7,387,507 B2 | 6/2008 | Schuler |
| 8,042,688 B2 | 10/2011 | Parks et al. |
| 8,100,452 B1 | 1/2012 | Homewood |
| 2004/0023387 A1* | 2/2004 | Morris ............... A61F 2/4644 435/379 |
| 2005/0251267 A1 | 11/2005 | Winterbottom et al. |
| 2005/0283255 A1 | 12/2005 | Geremakis et al. |
| 2006/0052879 A1 | 3/2006 | Kolb |
| 2006/0216323 A1 | 9/2006 | Knaack et al. |
| 2007/0088443 A1 | 4/2007 | Hanssen et al. |
| 2007/0098756 A1 | 5/2007 | Behnam |
| 2007/0110820 A1 | 5/2007 | Behnam |
| 2007/0191963 A1 | 8/2007 | Winterbottom et al. |
| 2009/0130173 A1 | 5/2009 | Behnam et al. |
| 2009/0192474 A1 | 7/2009 | Wei et al. |
| 2009/0234277 A1 | 9/2009 | Wei et al. |
| 2009/0240255 A1 | 9/2009 | McKay et al. |
| 2010/0203155 A1 | 8/2010 | Wei et al. |
| 2011/0054408 A1 | 3/2011 | Wei et al. |
| 2011/0070312 A1* | 3/2011 | Wei ............... A61L 27/3608 424/549 |
| 2011/0071536 A1 | 3/2011 | Kleiner et al. |
| 2011/0152754 A1 | 6/2011 | Cantor et al. |
| 2012/0097556 A1 | 4/2012 | Gascoine |
| 2012/0297902 A1 | 11/2012 | Leventhal et al. |
| 2013/0189338 A1* | 7/2013 | Drapeau ............ A61K 38/20 424/402 |
| 2014/0248328 A1* | 9/2014 | Wehmeyer ......... A61K 35/50 424/424 |
| 2015/0374883 A1* | 12/2015 | Lovick ............ A61L 27/46 424/9.4 |

* cited by examiner

*Primary Examiner* — John McCormack

(57) ABSTRACT

Methods for treating bulk bone tissue are provided. The methods comprise contacting bulk bone tissue or frozen bulk bone tissue with an effective amount of a supercritical fluid so as to dry the bulk bone tissue. In various embodiments, the supercritical fluid destroys contaminants such that the frozen bulk bone tissue is 99.9% substantially pure. In various embodiments, contaminants removed from the frozen bulk bone tissue include lipids, viruses, bacteria, pyrogens, prions, micro-organisms and/or pathogens. In some embodiments, the supercritical fluid causes a 3 log reduction of bacteria within the frozen bulk bone tissue.

18 Claims, No Drawings

METHODS FOR TREATING TISSUE MATERIALS

BACKGROUND

The rapid and effective repair of bone defects caused by injury, disease, wounds, or surgery is a goal of orthopedic surgery. Toward this end, a number of compositions and materials have been used or proposed for use in the repair of bone defects. The biological, physical, and mechanical properties of the compositions and materials are among the major factors influencing their suitability and performance in various orthopedic applications.

Autologous cancellous bone ("ACB"), also known as autograft or autogenous bone, is considered the gold standard for bone grafts. ACB is osteoinductive and nonimmunogenic, and, by definition, has all of the appropriate structural and functional characteristics appropriate for the particular recipient. Unfortunately, ACB is only available in a limited number of circumstances. Some individuals lack ACB of appropriate dimensions and quality for transplantation, and donor site pain and morbidity can pose serious problems for patients and their physicians.

Much effort has been invested in the identification or development of alternative bone graft materials. In the procurement and processing of xenograft or allograft, a prime consideration is minimizing the risk of transferring potentially harmful diseases to the bone recipient. In fact, provision of bulk bone tissue safe for transplantation provides a very special challenge as immunogenic material and also microorganisms and viruses can be found deep within the internal matrix of bone samples.

Transplanting contaminated bone can have serious consequences to the recipient. For example, transmission of human immunodeficiency virus (HIV) via bone grafting is well known. Accordingly, there is a great need for bone processing methods that decrease the risk of disease transmission associated with the use of, preparation and procurement of, transplantable bone to the recipient. In this regard it is also important to recognize that even if state of the art donor screening methodology is used, recent infections in a particular donor may not be detected, thereby underscoring the importance of improved cleaning and decontaminating treatments that offer prophylactic protection against potential, or as yet undetected, infectious agents.

In addition, of increasing concern is the presence of infectious prions in biologically derived materials used for xeongrafts and prosthetic devices. The widespread occurrence of prion-related disease and the possibility of inter-species transmission has serious implications for the biotechnology industry, which derives many of its products from mammalian tissue, including bone. Prions are more resistant toward inactivation than more conventional pathogens such as viruses or bacteria. Thus, relatively harsh conditions are required to decontaminate prion-containing biological materials. The only methods currently known to disinfect prion contaminated biological preparations are prolonged autoclaving at 130° C. or above, and treatment with concentrated sodium hydroxide solution.

Another concern is the presence of pyrogens. Pyrogens are substances which, even in an extremely small amount, cause abnormal elevations in the body temperatures of a patient and in extreme cases can cause fatal shock. A pyrogen can be endogenous or exogenous to the body. If a pyrogen finds its way into the bloodstream of a patient such as, for example, by intravenous injection of a medicine, it can cause a violent exothermic reaction independently of the principal action of the medicine. In some embodiments, a pyrogen can consist of any class of biological macromolecule including proteins, nucleic acids, carbohydrates, or lipids. There are a few methods to remove pyrogens from solutions. However, pyrogen removal can be difficult due to the high variability of their molecular weight and because they are relatively thermally stable and insensitive to pH changes.

One method of treating contaminated bone is sterilization. A variety of physical or chemical methods have been developed for use in sterilization and include, for example, exposure to chemicals or heat, or exposure to ionizing or non-ionizing radiation. Exemplary sterilization methods include treating prosthesis and graft components with chemical reagents. However, the chemical reagents themselves, or reaction byproducts derived from the reagents, can be harmful to the intended recipient of the prosthetic device. Accordingly, such chemicals must be removed prior to implantation of the devices. Common chemical sterilizing agents include ethylene oxide and formaldehyde, both of which are alkylating agents and, therefore, can modify and inactivate biologically active molecules. For example, ethylene oxide modifies the bone structure and negatively affects osteoinductivity. Both of these chemicals are, however, known to be carcinogens and mutagens.

Current methods for viral inactivation and sterilization involve the use of toxic chemicals, high temperature and/or irradiation. The harsh treatment of biological active materials such as bone grafting materials cause the degradation or decomposition of materials, destroy biological activity, for example osteoconductivity of demineralized bone matrix, and reduce mechanical properties significantly.

There are also significant limitations on the extent to which decontaminating agents have been used successfully to penetrate and to decontaminate matrix of bone. Bone matrix contains potentially removable materials, for example, marrow, cells and lipids that impede access of decontaminating agents deep into bulk bone tissue where infectious agents or immunogenic macromolecules may be present.

Accordingly, there is a need for methods of removing/destroying unwanted substances from bulk tissue material (e.g., frozen bulk bone tissue) including, but not limited to water, viruses, pyrogens, micro-organisms, pathogens and lipids so as to dry, clean, sterilize, delipidate and/or to depyrogenate, and to aid in the storage and/or further processing of the tissue.

SUMMARY

Methods for drying, sterilizing and/or cleaning bulk bone tissue are provided. These methods remove unwanted substances from the bulk bone tissue (e.g., bulk allograft tissue) without compromising the integrity of desirable biomaterials, and at the same time provide bone suitable for transplantation. These methods also provide a different starting material (e.g., frozen bulk bone tissue) than prior methods have used for drying, sterilizing and/or cleaning bone. Bulk bone tissue is easier to handle and manipulate, providing for more efficient decontamination of bone. These methods render the bulk bone tissue in a state that allows long-term room temperature storage without losing structure or osteoinductivity.

In some embodiments, the present method allows bulk bone tissue (e.g., bulk allograft tissue) to be efficiently processed to produce decontaminated bulk bone allografts. In some embodiments, the bone tissue is harvested from a cadaver in bulk quantity (e.g., bulk bone tissue) and is then frozen. The bulk bone tissue is then treated with supercritical fluid to decontaminate the bulk bone tissue.

In some embodiments, a method for drying frozen bulk bone tissue is provided. The method comprises contacting frozen bulk bone tissue with an effective amount of a supercritical fluid so as to dry the bulk bone tissue.

In various embodiments, a method of drying and sterilizing frozen bulk bone tissue is provided. The method comprises contacting frozen bulk bone tissue with an effective amount of a supercritical fluid so as to dry and sterilize the bulk bone tissue.

In some embodiments, a method of drying, sterilizing and cleaning frozen bulk bone tissue is provided. The method comprises contacting frozen bulk bone tissue with an effective amount of a supercritical fluid so as to dry, sterilize and clean the bulk bone tissue.

In various embodiments, the methods clean, delipidate, and virally inactivate the frozen bulk bone tissue so as to destroy contaminants. In some embodiments, the contaminants comprise lipids, viruses, bacteria, pyrogens, prions, micro-organisms and/or pathogens.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the detailed description is to be regarded as illustrative in nature and not restrictive.

DETAILED DESCRIPTION

Definitions

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Similarly, when values are expressed as approximations, by use of the antecedent "about," it will be understood that the particular value forms another embodiment that is +/−10% of the recited value. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

Notwithstanding that the numerical ranges and parameters setting forth the broad scope of this application are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

Bioactive agent, bioactive compound or bioactive material is used herein to refer to a compound or entity that alters, inhibits, activates, or otherwise affects biological or chemical events. For example, bioactive agents may include, but are not limited to, osteogenic or chondrogenic proteins or peptides, anti-AIDS substances, anti-cancer substances, antibiotics, immunosuppressants, anti-viral substances, enzyme inhibitors, hormones, neurotoxins, opioids, hypnotics, anti-histamines, lubricants, tranquilizers, anti-convulsants, muscle relaxants and anti-Parkinson substances, antispasmodics and muscle contractants including channel blockers, miotics and anti-cholinergics, anti-glaucoma compounds, anti-parasite and/or anti-protozoal compounds, modulators of cell-extracellular matrix interactions including cell growth inhibitors and antiadhesion molecules, vasodilating agents, inhibitors of DNA, RNA or protein synthesis, anti-hypertensives, analgesics, anti-pyretics, steroidal and non-steroidal anti-inflammatory agents, anti-angiogenic factors, angiogenic factors, anti-secretory factors, anticoagulants and/or antithrombotic agents, local anesthetics, ophthalmics, prostaglandins, anti-depressants, anti-psychotic substances, anti-emetics, and imaging agents. In certain embodiments, the bioactive agent is a drug. Bioactive agents further include RNAs, such as siRNA, and osteoclast stimulating factors. In some embodiments, the bioactive agent may be a factor that stops, removes, or reduces the activity of bone growth inhibitors. In some embodiments, the bioactive agent is a growth factor, cytokine, extracellular matrix molecule or a fragment or derivative thereof, for example, a cell attachment sequence such as RGD. A more complete listing of bioactive agents and specific drugs suitable for use in the present application may be found in "Pharmaceutical Substances: Syntheses, Patents, Applications" by Axel Kleemann and Jurgen Engel, Thieme Medical Publishing, 1999; the "Merck Index: An Encyclopedia of Chemicals, Drugs, and Biologicals", edited by Susan Budavari et al., CRC Press, 1996; and the United States Pharmacopeia-25/National Formulary-20, published by the United States Pharmacopeia Convention, Inc., Rockville Md., 2001, each of which is incorporated herein by reference.

Biocompatible, as used herein, is intended to describe materials that, upon administration in vivo, do not induce undesirable long-term effects.

Tissue or bulk tissue material, as used herein, refers to a bulk quantity of an ensemble of similar cells from the same origin that together carry out a specific function. For example, tissue or bulk tissue material includes muscle, ligaments, tendons, cartilage and/or bone. The tissue or bulk tissue material is harvested from a cadaver. In some embodiments, the tissue or bulk tissue material is frozen and is not thawed. In various embodiments, the bulk tissue material is shaped as segments, shafts, particulates, fibers, plates, cuboidal, sheets, rods, ovals, strings, elongated particles, wedges, discs, rectangular, and/or polyhedral.

Bone or bulk bone tissue, as used herein, refers to tissue or bulk tissue material that is cortical, cancellous or cortico-cancellous of autogenous, allogenic, xenogenic, or transgenic origin. Bone is also used in the most general sense and includes all types of human or animal bulk bone tissue, including whole bones, bone pieces, bone blocks with attached connective tissues such as ligaments and tendons, as well as ground bone preparations and ground demineralized bone preparations. Bulk bone tissue is easier to handle and manipulate, providing for more efficient decontamination of bone. In some embodiments, the bone or bulk bone tissue is wet, dry, frozen, or is not frozen. In some embodiments, the bone or bulk bone is at room temperature. In some embodiments, the bone or bulk bone tissue is wet and can include buffers, water, organic protic solvent, aqueous solution such as physiological saline, concentrated saline solutions, sugar solutions, ionic solutions of any kind, and liquid polyhydroxy compounds such as glycerol and glycerol esters, and mixtures thereof. In some embodiments, the bone or bulk bone tissue is dry lyophilized bone. The bone or bulk bone tissue is lyophilized following procedures well known in the art. For example, in some embodiments, the bone together with a conserving agent is initially frozen to $-76°$ C. The bone and conserving agent are then subjected to a vacuum of less than 100 militorr while the temperature is maintained at or below $-35°$ C. The end point of the lyophilization is the determination of residual moisture of approximately 5% or less. Once the bone has been lyophilized, it can be stored in a sealed, vacuum-contained bottle.

In some embodiments, the tissue, bulk tissue material, bone and/or bulk bone tissue is selected at a particular length, such as, from about 1 cm to about 55 cm. In various embodiments, the length of the tissue, bulk tissue material, bone and/or bulk bone tissue is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54 or 55 cm. In various embodiments, the thickness of the tissue, bulk tissue material, bone and/or bulk bone tissue is about 1 cm to about 25 cm. In various embodiments, the thickness of the tissue, bulk tissue material, bone and/or bulk bone tissue is about 1, 2, 3, 4, 5, 6, 7, 8, 9, 10, 11, 12, 13, 14, 15, 16, 17, 18, 19, 20, 21, 22, 23, 24 or 25.

In some embodiments, bulk bone tissue is not particulated. In some embodiments, bulk bone tissue is frozen and not particulated. In some embodiments, bulk bone tissue is frozen and then particulated.

In some embodiments, the terms "bulk bone tissue," "bulk tissue material," and "bulk allograft tissue" can be used interchangeably with one another.

Demineralized, as used herein, refers to any material generated by removing mineral material from tissue, for example, bulk bone tissue. In certain embodiments, the demineralized compositions described herein include preparations containing less than 5% calcium. In some embodiments, the demineralized compositions may comprise less than 1% calcium by weight. In some embodiments, the demineralized compositions described herein include preparations containing less than 5, 4, 3, 2, and/or 1% calcium by weight.

Partially demineralized bone is intended to refer to preparations with greater than 5% calcium by weight but containing less than 100% of the original starting amount of calcium. In various embodiments, partially demineralized bone includes 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 and/or 99% calcium by weight. In some embodiments, partially demineralized bone contains from about 8% to about 90% weight percent of their original inorganic mineral content. In some embodiments, partially demineralized contains from about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 and/or 90% weight percent of their original inorganic mineral content.

In some embodiments, demineralized bone has less than 95% of its original mineral content. In various embodiments, demineralized bone has less than 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6 and/or 5% of its mineral content. "Demineralized" is intended to encompass such expressions as "substantially demineralized," "partially demineralized," "surface demineralized," and "fully demineralized." "Partially demineralized" is intended to encompass "surface demineralized."

Demineralized bone activity refers to the osteoinductive activity of demineralized bone.

Demineralized bone matrix (DBM), as used herein, refers to any material generated by removing mineral material from bone tissue. In some embodiments, the DBM compositions as used herein include preparations containing less than 5% calcium and, in some embodiments, less than 1% calcium by weight. In some embodiments, DBM includes preparations containing less than 5, 4, 3, 2 and/or 1% calcium by weight. In other embodiments, the DBM compositions comprise partially demineralized bone (e.g., preparations with greater than 5% calcium by weight but containing less than 100% of the original starting amount of calcium). In some embodiments, DBM includes preparations containing more than 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 and/or 99% calcium by weight.

Superficially demineralized, as used herein, refers to bone-derived elements possessing at least about 90% weight percent of their original inorganic mineral content. In some embodiments, superficially demineralized contains at least about 90, 91, 92, 93, 94, 95, 96, 97, 98 and/or 99% weight percent of their original inorganic mineral content.

The expression "fully demineralized" as used herein refers to bone containing less than 8% of its original mineral context. In some embodiments, fully demineralized contains less than 8, 7, 6, 5, 4, 3, 2 and/or 1% of its original mineral content.

Surface demineralized, as used herein, refers where the surface of the bone-derived elements are substantially demineralized, partially demineralized, or fully demineralized, yet the bodies of the bone-derived elements are fully mineralized.

Osteoconductive, as used herein, refers to the ability of a substance to serve as a template or substance along which bone may grow.

Osteogenic, as used herein, refers to materials containing living cells capable of differentiation into bone tissue.

Osteoimplant, as used herein, refers to any implant prepared in accordance with the embodiments described herein and therefore may include expressions such as bulk tissue material (e.g., bulk bone tissue, bone membrane and/or bone graft).

Osteoinductive, as used herein, refers to the quality of being able to recruit cells from the host that have the potential to stimulate new bone formation. Any material that can induce the formation of ectopic bone in the soft tissue of an animal is considered osteoinductive. For example, most osteoinductive materials induce bone formation in athymic rats when assayed according to the method of Edwards et al., "Osteoinduction of Human Demineralized Bone: Characterization in a Rat Model," Clinical Orthopaedics & Rel. Res., 357:219-228, December 1998, incorporated herein by reference.

The expression "average length to average thickness ratio" as applied to DBM fibers of the present application means the ratio of the longest average dimension of the fiber (average length) to its shortest average dimension (average thickness). This is also referred to as the "aspect ratio" of the fiber.

Fibrous, as used herein, refers to bone elements whose average length to average thickness ratio or aspect ratio of the fiber is from about 50:1 to about 1000:1. In some embodiments, the fibrous bone elements have an average length to average thickness ratio or aspect ratio of the fiber from about 50:1, 75:1, 100:1, 125:1, 150:1, 175:1, 200:1, 225:1, 250:1, 275:1, 300:1, 325:1, 350:1, 375:1, 400:1, 425:1, 450:1, 475:1, 500:1, 525:1, 550:1, 575:1, 600:1, 625:1, 650:1, 675:1, 700:1, 725:1, 750:1, 775:1, 800:1, 825:1, 850:1, 875:1, 900:1, 925:1, 950:1, 975:1, 1000:1, 1:50, 1:75, 1:100, 1:125, 1:150, 1:175, 1:200, 1:225, 1:250, 1:275, 1:300, 1:325, 1:350, 1:375, 1:400, 1:425, 1:450, 1:475, 1:500, 1:525, 1:550, 1:575, 1:600, 1:625, 1:650, 1:675, 1:700, 1:725, 1:750, 1:775, 1:800, 1:825, 1:850, 1:875, 1:900, 1:925, 1:950, 1:975, 1:1000. In overall appearance the fibrous bone elements can be described as bone fibers, threads, narrow strips, or thin sheets. Often, where thin sheets are produced, their edges tend to curl up toward each other. The fibrous bone elements can be substantially linear in appearance or they can be coiled to resemble springs. In some embodiments, the bone fibers are of irregular shapes including, for example, linear, serpentine or curved shapes. In some embodiments, the bone fibers are demineralized; however some of the original mineral content may be retained when desirable for a particular embodiment.

Non-fibrous, as used herein, refers to bone elements that have an average width substantially larger than the average thickness of the fibrous bone element or aspect ratio of less than from about 50:1 to about 1000:1. In some embodiments, the non-fibrous bone elements have an average width substantially larger than the average thickness of the fibrous bone element or aspect ratio of less than from about 50:1, 75:1, 100:1, 125:1, 150:1, 175:1, 200:1, 225:1, 250:1, 275:1, 300:1, 325:1, 350:1, 375:1, 400:1, 425:1, 450:1, 475:1, 500:1, 525:1, 550:1, 575:1, 600:1, 625:1, 650:1, 675:1, 700:1, 725:1, 750:1, 775:1, 800:1, 825:1, 850:1, 875:1, 900:1, 925:1, 950:1, 975:1, 1000:1, 1:50, 1:75, 1:100, 1:125, 1:150, 1:175, 1:200, 1:225, 1:250, 1:275, 1:300, 1:325, 1:350, 1:375, 1:400, 1:425, 1:450, 1:475, 1:500, 1:525, 1:550, 1:575, 1:600, 1:625, 1:650, 1:675, 1:700, 1:725, 1:750, 1:775, 1:800, 1:825, 1:850, 1:875, 1:900, 1:925, 1:950, 1:975, 1:1000.

In some embodiments, the non-fibrous bone elements are shaped in a substantially regular manner or specific configuration, for example, triangular prism, sphere, cube, cylinder and other regular shapes. By contrast, particles such as chips, shards, or powders possess irregular or random geometries. It should be understood that some variation in dimension will occur in the production of the elements of this application and elements demonstrating such variability in dimension are within the scope of this application and are intended to be understood herein as being within the boundaries established by the expressions "mostly irregular" and "mostly regular".

Lipid, as used herein, refers to any one or more of a group of fats or fat-like substances occurring in humans or animals. The fats or fat-like substances are characterized by their insolubility in water and solubility in organic solvents. Lipid also includes, but is not limited to, complex lipid, simple lipid, triglycerides, fatty acids, glycerophospholipids (phospholipids), true fats such as esters of fatty acids, glycerol, cerebrosides, waxes, and sterols such as cholesterol and ergosterol. As used herein, lipid also includes lipid-containing organisms, such as lipid-containing infectious agents. Lipid-containing infectious agents are defined as any infectious organism or infectious agent containing lipids. Such lipids may be found, for example, in a bacterial cell wall or viral envelope. Lipid-containing organisms include but are not limited to eukaryotic and prokaryotic organisms, bacteria, viruses, protozoa, mold, fungi, and other lipid-containing parasites.

Delipidation, as used herein, refers to the process of removing lipids from tissue material (e.g., frozen bulk bone tissue) or from a lipid-containing organisms contained in tissue material.

Contaminants or infectious organisms, as used herein, refer to any lipid-containing infectious organism capable of causing infection. Some infectious organisms include bacteria, viruses, protozoa, parasites, fungi and mold.

Virus, as used herein, refers to viruses and virus-like particles including enveloped or lipid-coated viruses, and non-enveloped, protein encased viruses. A "virion" is an individual virus entity or particle. As used herein, the term "inactive" means the virion particle is unable to replicate or infect a host cell.

Pyrogen, as used herein, refers to substances which cause abnormal elevation of body temperatures of homothermal animals. Pyrogens can be endogenous or exogenous to the body. In some embodiments, a pyrogen comprises any class of biological macromolecule including proteins, nucleic acids, carbohydrates, or lipids. In various embodiments, endogenous pyrogens include, but are not limited to cytokines, such as, for example, interleukin 1 ($\alpha$ and $\beta$), interleukin 6 (IL-6), interleukin-8, tumor necrosis factor-$\beta$, macrophage inflammatory protein-$\alpha$ and macrophage inflammatory protein-$\beta$ as well as interferon-$\alpha$, interferon-$\beta$, and interferon-$\gamma$, tumor necrosis factor-$\alpha$. Exogenous pyrogens include, but are not limited to lipopolysaccharides (LPS).

Pyrogen-free, as used herein, refers to a substance, solution and/or material that is free from the presence of pyrogens and does not contain deposits of bacteria and other agents in the substance, solution and/or material.

Depyrogenation, as used herein, refers to the removal of pyrogens from a substance, solution and/or material. In some embodiments, depyrogenation comprises the removal of pyrogens from a composition.

Treating as used herein, refers to an act or process of destroying contaminants and/or removing matter, materials or substances by drying, sterilizing, cleaning, delipidating, and/or virally inactivating a material, such as, for example, a bulk tissue material (e.g., frozen bulk bone tissue).

Sterilization, as used herein, refers to an act or process using either physical or chemical means for eliminating or inactivating substantially all viable organisms, especially micro-organisms, viruses and other pathogens, associated with a xenograft or bio-prosthetic device. As used herein, "sterilized" includes bulk tissue material (e.g., frozen bulk bone tissue) achieving a sterility assurance level of 10-6 colony forming unit (CFU), as determined by FDA (Federal Drug Administration) standards.

Bioburden, as used herein, refers to the number of bacteria living on a surface that has not been sterilized. Bioburden reduction, as used herein, refers to the reduction of microorganisms on the surface of a bulk tissue material. In some embodiments, the bioburden may be reduced from about 1-log to about 10-log reduction in CFUs when subjecting the bulk bone tissue to supercritical fluid. In some embodiments, the log reduction of subjecting the bulk bone tissue to supercritical fluid is a 1, 2, 3, 4, 5, 6, 7, 8, 9 or 10-log reduction.

In some embodiments, a method is provided for treating bulk bone tissue (e.g., frozen bulk bone tissue). In various embodiments, supercritical fluid is used to remove or destroy unwanted substances from bulk bone tissue including water, lipids, viruses, micro-organisms, pathogens, prions and pyrogens. In various embodiments, the method dries, cleans and/or sterilizes the bulk bone tissue so that the bulk bone tissue can be stored and/or further processed. In some embodiments, the method does not use chemicals and the method is controlled to preserve the biological integrity of the bulk bone tissue.

In various embodiments, a method is provided that is an all-in-one process for treating bulk bone tissue comprising supercritical fluid. In some embodiments, the bulk bone tissue is cut in segments, shafts, particulates, fibers, chips, and/or strips. In various embodiments, the method cleans, delipidates, sterilizes, virally inactivates and dries tissue under a controlled biologically friendly environment. In some embodiments, no harsh chemicals are used and the biological integrity of the bulk bone tissue is preserved. In some embodiments, the method effectively treats, stores and preserves the bulk bone tissue.

In various embodiments, supercritical fluids are used in preparing frozen bulk tissue material (e.g., frozen bulk bone tissue) for incorporation into xenografts and bio-prosthetic devices. Supercritical fluids are used to remove lipids, contaminants and/or to inactivate infectious agents from the frozen bulk tissue material under conditions which do not significantly degrade or denature tissue proteins, so as to preserve the biological integrity of the bulk tissue material. In various embodiments, the structural integrity of the frozen bulk bone tissue is preserved and the three dimensional (3-D) structure of the frozen bulk bone tissue remains intact. Supercritical fluids are also used to remove lipids which can interfere with cleaning and decontamination of frozen bulk tissue material (e.g., frozen bulk bone tissue).

Fluids in the supercritical state are materials, which are under conditions of temperature and pressure such that their properties are intermediate between those of gases and those of liquids. They are also called "dense gases" or "expanded liquids". For a given chemical substance, the precise point on the temperature-pressure diagram at which the two phases, liquid and vapor form only one phase is called the critical point. Beyond this critical temperature (Tc) and critical pressure (Pc), the fluid is in the so-called "supercritical" state.

The headings below are not meant to limit the disclosure in any way; embodiments under any one heading may be used in conjunction with embodiments under any other heading.

Supercritical Fluids

In the field of physical chemistry, the term "critical fluid" refers to a gas at or above its critical temperature and at or above its critical pressure. The term "supercritical fluid" refers to a gas above its critical temperature and above its critical pressure. Supercritical fluids are sometimes designated in this application by the abbreviation "SCF." The term "near critical" is used in the sense of approaching or close to being critical. At or near the critical pressure and temperature supercritical fluids conform to the equation:

$$Tr=To/Tc$$

Where Tr is the reduced temperature in absolute degrees; To is the absolute operating temperature; and Tc is the absolute critical temperature. In some embodiments, Tr is 0.1 to 2.0.

At or near the critical pressure and temperature supercritical fluids conform to the equation:

$$Pr=Po/Pc$$

Where Pr is the reduced pressure; Po is the operating pressure; and Pc is the critical pressure. In some embodiments, Pr is about 0.2 to 20.0 or about 0.5 to 10.0. In some embodiments, the Pr is about 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 or 20. As used herein, the term "near critical" means having a reduced pressure, Pr of 0.2 to 1.0 and/or reduced temperature, Tr of 10 to 1.0.

One example, without limitation, of a near critical fluid is a gas having a temperature below its critical temperature and a pressure at or above the critical pressure. Such gas has properties, which may approach those of a supercritical or critical fluid, particularly in solvating properties.

Supercritical fluids of use in the present application include any supercritical fluid, either substantially pure or containing additives, such as cosolvents, for example, ethanol, methanol, acetone, and ethylene glycols or combinations thereof. Cosolvents can be introduced to affect, inter alia, the polarity of the critical fluid, thereby enhancing the capacity of the critical fluid to extract or deliver certain materials. Other useful additives are those that act to entrain or solvate species, such as infectious agents and chemical agents, thereby facilitating the removal of these agents from the tissue, for example, surfactants, detergents, or cyclodextrin.

In various embodiments, supercritical fluids include, one or more compounds of fluorocarbons, alkanes and combinations thereof. In some embodiments, fluorocarbons include, but are not limited to, chlorodifluoromethane and trifluoromethane. Examples of alkanes include one or more compounds of ethylene, propane and ethane. In various embodiments, supercritical fluids include nitrous oxide, nitrogen and carbon dioxide, water, methane and/or propylene.

In some embodiments, the temperature of the supercritical fluid ranges from about 31.0° C. to about 200° C. for drying, sterilizing and/or cleaning frozen bulk bone tissue. In some embodiments, the temperature of the supercritical fluid is 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 155, 160, 165, 170, 175, 180, 185, 190, 195, and/or 200° C. for drying, sterilizing and/or cleaning frozen bulk bone tissue.

In some embodiments, the supercritical fluid contacts the frozen bulk bone tissue at a particular pressure, such as, for example, at a pressure from about 50 to about 600 bar. In some embodiments, the pressure of the supercritical fluid is about 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795 and/or 800 bar.

In some embodiments, the supercritical fluid contacts the frozen bulk bone tissue for a particular amount of time, such as, for example, in a range from about 5 minutes to about 8 hours. In various embodiments, the supercritical fluid contacts the frozen bulk bone tissue for a particular amount of time, such as, for example, in a range from about 1 to about 2 hours. In some embodiments, the supercritical fluid contacts the frozen bulk bone tissue for a particular amount of time, such as, for example, in a range from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 minutes (1 hour), 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120 minutes (2 hours), 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180 minutes (3 hours), 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240 minutes (4 hours), 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300 minutes (5 hours), 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360 minutes (6 hours), 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420 minutes (7 hours), 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, or 780 minutes (8 hours).

In some embodiments, the supercritical fluid contacts frozen bulk bone tissue, where the temperate of the frozen bulk bone tissue is from about −20° C. to about −70° C. In some embodiments, the frozen bulk bone tissue is frozen at a particular temperature such as, for example, at −20, −21, −22, −23, −24, −25, −26, −27, −28, −29, −30, −31, −32, −33, −34, −35, −36, −37, −38, −39, −40, −41, −42, −43, −44, −45, −46, −47, −48, −49, −50, −51, −52, −53, −54, −55, −56, −57, −58, −59, −60, −61, −62, −63, −64, −65, −66, −67, −68, −69 or −70° C. In some embodiments, the bulk bone tissue is frozen in a freezer set at a predetermined temperature. In various embodiments, the bulk bone tissue is frozen via a solid freezing agent such as, for example, frozen carbon dioxide or a liquid gas freezing agent. In some embodiments, the bulk bone tissue is frozen by a cryogenic coolant. In various embodiments, the cryogenic coolant includes, but is not limited to liquid nitrogen, helium, neon, argon and/or krypton. In some embodiments, a cryoprotectant chemical, such as glycerol or dimethyl sulfoxide is applied to the bulk bone tissue before it is frozen to protect the bulk bone tissue from the cryogenic coolant. In various embodiments, the frozen bulk bone tissue is not thawed, and remains frozen until treated with the supercritical fluid.

In some embodiments, a log reduction from about 1-log to about 10-log reduction in CFUs may be achieved by subjecting the frozen bulk bone tissue to supercritical fluid. In some embodiments, the log reduction of subjecting the frozen bulk bone tissue to supercritical fluid is a 1, 2, 3, 4, 5, 6, 7, 8, 9 or 10-log reduction.

In various embodiments, the supercritical fluid is carbon dioxide. In some embodiments, the critical temperature of carbon dioxide is low at 31° C. Thus, in some embodiments, carbon dioxide can be in the supercritical state while at a temperature of around 31° C. and at a pressure of around 73.8 bars. Moreover, the solvent power of carbon dioxide is excellent. For example, it is known that many fatty acids and triglycerides have solubility in carbon dioxide in the supercritical state of up to 10%. In some embodiments, the temperature of the supercritical carbon dioxide is from about 31.0° C. to about 150° C. for treating frozen bulk bone tissue. In some embodiments, the temperature of supercritical carbon dioxide is 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, and/or 150° C. for treating frozen bulk bone tissue.

In some embodiments, a log reduction from about 1-log to about 10-log reduction in CFUs may be achieved by subjecting the frozen bulk bone tissue to supercritical carbon dioxide. In some embodiments, the log reduction of subjecting the frozen bulk bone tissue to supercritical carbon dioxide is a 1, 2, 3, 4, 5, 6, 7, 8, 9 or 10-log reduction. In some embodiments, a 6-log reduction and/or a 3-log reduction in CFUs may be achieved by subjecting frozen bulk bone tissue to be treated under sterilization temperature and pressure conditions where supercritical carbon dioxide is a sterilant fluid. In some embodiments, a 3-log reduction of bacteria within the frozen bulk bone tissue is achieved. In various embodiments, a 6-log reduction of bacteria within the frozen bulk bone tissue is achieved.

In some embodiments, the supercritical carbon dioxide contacts the frozen bulk bone tissue at a particular pressure, such as, for example, at a pressure from about 50 to about 800 bars for treating the frozen bulk bone tissue. In some embodiments, the supercritical carbon dioxide contacts the frozen bulk bone at a particular pressure, such as, for example, at a pressure from about 50 to about 800 bar, from about 150 to about 400 bar, from about 250 to about 300 bar for treating frozen bulk bone tissue. In some embodiments, the carbon dioxide contacts frozen bulk bone tissue frozen at a temperature from about −20° C. to about −70° C.

In some embodiments, the carbon dioxide contacts the frozen bulk bone tissue for a particular amount of time, such as, for example, in a range from about 5 minutes to about 8 hours. In some embodiments, the carbon dioxide is substantially pure. Thus, trace amounts of other gases may be tolerated provided that the sterilization properties of the carbon dioxide are not impaired. For ease of further discussion below, the term "supercritical carbon dioxide" will be used, but it will be understood that such a term is non-limiting in that carbon dioxide within the pressure and temperature ranges as noted immediately above may be employed satisfactorily in the practice of the present application.

In some embodiments, other mediums such as freon, including Freon 13 (chlorotrifluoromethane), may be used as the supercritical fluid. In some embodiments, fluids suitable for supercritical delipidation and sterilization include, but are not limited to, supercritical carbon dioxide (critical point 304.25 K at 7.39 MPa or 31.1° C. at 1072 psi or 31.2° C. and 73.8 bar) and freon (about 300 K at 3.5-4 MPa or 25 to 30° C. at 500-600 psi). Nitrous oxide has similar physical behavior to carbon dioxide, but is a powerful oxidizer in its supercritical state. Supercritical water is also a powerful oxidizer, partly because its critical point occurs at such a high temperature (374° C.) and pressure (3212 psi/647K and 22.064 MPa).

In some embodiments, the supercritical fluid, such as carbon dioxide, is used in the current methods to also virally inactivate. In some embodiments, thus, the frozen bulk bone tissue is placed in a supercritical carbon dioxide chamber and liquid carbon dioxide is introduced, for example, by an air pump. The temperature is raised to for example, 105° C. with corresponding pressure at about 485 bar. In alternative embodiments, other temperatures and/or pressures above the critical point of carbon dioxide or any other supercritical fluid may be used. The frozen bulk bone tissue samples are soaked in supercritical carbon dioxide for a certain time and carbon dioxide is released. The resulting bulk bone tissue samples retain surface morphologies, hence surface area, and osteoinductivity after such treatment.

Treatment of Frozen Bulk Bone Tissue with Supercritical Fluid

In some embodiments, the present methods allow frozen bulk allograft tissue to be efficiently processed to produce decontaminated bulk bone allografts. In some embodiments, the present methods render the bulk bone tissue in a state that allows long-term room temperature storage without losing structure or osteoinductivity. In some embodiments, the bone tissue is harvested from a cadaver in bulk quantity (e.g., bulk bone tissue) and is then frozen. The bulk bone tissue is then treated with supercritical fluid to decontaminate the bulk bone tissue.

In various embodiments, a method of drying frozen bulk bone tissue is provided. A method of drying frozen bulk bone tissue, the method comprising: contacting frozen bulk bone tissue with an effective amount of a supercritical fluid so as to dry the bulk bone tissue. In some embodiments, the supercritical fluid comprises supercritical carbon dioxide, water, methane, ethane, propane, ethylene, propylene, methanol, ethanol or acetone. In various embodiments, the supercritical fluid is supercritical carbon dioxide. In some embodiments, the contacting step comprises contacting the frozen bulk bone tissue with the supercritical fluid for a period of time and returning the supercritical fluid to a non-supercritical state. In some embodiments, the supercritical fluid contacts the frozen bulk bone tissue from about 5 minutes to about 8 hours. In various embodiments, the supercritical fluid contacts the frozen bulk tissue from about 1 to about 2 hours. In some embodiments, the supercritical fluid is at a pressure from about 50 bars to about 800 bar and at a temperature from about 31.0° C. to about 150° C. In some embodiments, the supercritical fluid is at a pressure of about 800 bar and at a temperature of about 150° C. In some embodiments, the frozen bulk tissue is frozen at temperature of about −20° C. to about −70° C. In various embodiments, the frozen bulk tissue is mineralized bone, demineralized bone, partially demineralized bone, fully demineralized bone, surface demineralized bone, mineralized bone matrix, demineralized bone matrix, partially demineralized bone matrix, fully demineralized bone matrix, surface demineralized bone matrix or combinations thereof; the frozen bulk bone tissue is derived from tendon, cartilage, meniscus or hard bone; and the bulk tissue material comprises segments, shafts, particulates, fibers, chips or rods. In some embodiments, the method further comprises cleaning, delipidating, viral inactivating and sterilizing the frozen bulk bone tissue so as to destroy contaminants. In some embodiments, the contaminants comprise lipids, viruses, bacteria, pyrogens, prions, micro-organisms or pathogens. In some embodiments, the supercritical fluid destroys the contaminants such that the frozen bulk bone tissue is at least 90% substantially pure or 99.9% substantially pure. In various embodiments, the supercritical fluid causes a 3-log reduction, a 4-log reduction, a 5-log reduction or a 6-log reduction of bacteria within the frozen bulk bone tissue.

In various embodiments, a method of drying and sterilizing frozen bulk bone tissue is provided. The method comprises contacting frozen bulk bone tissue with an effective amount of a supercritical fluid so as to dry and sterilize the bulk bone tissue. In some embodiments, the contacting step comprises contacting the frozen bulk bone tissue with the supercritical fluid at a pressure from about 50 bars to about 800 bars at a temperature from about 31.0° C. to about 150° C. for a period of 1 to 2 hours; and returning the supercritical fluid to a non-supercritical state. In some embodiments, the method destroys contaminants such that the frozen bulk bone tissue is 99.9% substantially pure. In some embodiments, the frozen bulk bone tissue is obtained from cortical autogenic, cortical allogenic, cortical xenogenic cancellous autogenic, cancellous allogenic, cancellous xenogenic, cortical transgenic, cancellous transgenic, corticocancellous autogenic, corticocancellous allogenic, corticocancellous xenogenic or corticocancellus transgenic bone.

In various embodiments, a method of drying, sterilizing and cleaning frozen bulk bone tissue is provided. The method comprises contacting frozen bulk bone tissue with an effective amount of a supercritical fluid so as to dry, sterilize and clean the bulk bone tissue. In some embodiments, the supercritical fluid comprises carbon dioxide; the contacting step comprises the supercritical fluid contacting the frozen bulk bone tissue at a pressure from about 50 bar to about 800 bar and at a temperature from about 31.0° C. to about 150° C. for a period of 1 to 2 hours; and the frozen bulk bone tissue is 99.9% substantially pure after being treated with the supercritical fluid.

In some embodiments, the methods of drying, drying and sterilizing, and/or drying, sterilizing and cleaning frozen bulk bone tissue causes the frozen bulk bone tissue to have a moisture content of less than about 50% to less than about 1%. In some embodiments, the frozen bulk bone tissue has a moisture content of less than about 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2 or less than about 1%.

Delipidation Using Supercritical Fluid

Supercritical fluids, like liquids have high density and, as a result are very good solvents. Moreover, because they have low viscosity and high diffusion coefficients, supercritical fluids can be used to reach components entrapped in bulk bone tissue, such as lipids. In various embodiments, carbon dioxide is utilized for delipidation of fats present in bulk bone tissue. Easily available and cheap, carbon dioxide is non-toxic, non-corrosive and non-flammable and, thus well suited for delipidation of bulk bone tissue. The result of this is that such a fluid in the supercritical state dissolves the essentially lipidic organic matter present in the bulk bone tissue easily and virtually completely. The risks to the immune system and of infection are thereby considerably reduced.

In various embodiments, the method removes at least a lipid from the bulk bone tissue. In some embodiments, frozen bulk bone tissue subjected to the delipidation methods described herein can be from about 90 to about 99.9% free of lipids. In some embodiments, frozen bulk bone tissue subjected to the delipidation methods described herein can be 99, 99.5 or 99.9% free of lipids. In some embodiments, the frozen bulk bone tissue subjected to the delipidation methods described herein can be 90, 90.5, 91, 91.5, 92, 92.5, 93, 93.5, 94, 94.5, 95, 95.5, 96, 96.5, 97, 97.5, 98 or 98.5% free of lipids. In various embodiments, the treated bulk bone tissue itself will contain less than 1%, 0.5% or 0.1% fat on average after treatment, and this amount is evenly distributed.

Terminal Sterilization Using Supercritical Fluid

In various embodiments, the method removes from the frozen bulk bone tissue contaminants such as bacteria, viruses, fungi and/or protozoa. In various embodiments, the method removes 99.0%, 99.5% or 99.9% of contaminants.

Some bacteria which may be treated include, but are not limited to the following: *Staphylococcus; Streptococcus*, including *S. pyogenes; Enterococci; Bacillus*, including *Bacillus anthracis*, and *Lactobacillus; Listeria; Corynebacterium diphtheriae; Gardnerella* including *G. vaginalis; Nocardia; Streptomyces; Thermoactinomyces vulgaris; Treponema; Camplyobacter; Pseudomonas* including *P. aeruginosa; Legionella; Neisseria* including *N. gonorrhoeae* and *N. meningitides; Flavobacterium* including *F. meningosepticum* and *F. odoratum; Brucella; Bordetella* including *B. pertussis* and *B. bronchiseptica; Escherichia* including *E. coli; Klebsiella; Enterobacter; Serratia* including *S. marcescens* and *S. liquefaciens; Edwardsiella; Proteus* including *P. mirabilis* and *P. vulgaris; Streptobacillus; Rickettsiaceae* including *R. rickettsii; Chlamydia* including *C. psittaci* and *C. trachomatis; Mycobacterium* including *M. tuberculosis, M. intracellulare, M. fortuitum, M. laprae, M. avium, M. bovis, M. africanum, M. kansasii, M. intracellulare*, and *M. lepraemurium*; and *Nocardia*, and any other bacteria containing lipid in their membranes.

In some embodiments, exemplary infectious agents removed from the frozen bulk bone tissue include, viruses, bacteria, mycobacteria, *mycoplasma*, fungi, prions and/or constituents thereof. In various embodiments, methods of this application are applicable to removing viruses of the family of Togaviridae, in particular of the genus *Alphavirus*, such as the Hepatitis C virus, and for preventing their transmission during tissue grafts; for combating viruses of the family Picorviridae, in particular of the genus Enterovirus, more particularly the Polio Sabin virus, and preventing their transmission during tissue grafts; for combating viruses of the family Herpesviridae and preventing their transmission during tissue grafts; for combating viruses of the family Retroviridae, in particular of the genus *Lentivirus*, more particularly human HIV immunodeficiency viruses, and preventing their transmission during tissue grafts. In various embodiments, the methods of the present application remove prions from the frozen bulk bone tissue.

In some embodiments, the method inactivates viruses, especially enveloped or lipid-coated viruses, and nonenveloped, protein encased viruses in proteinaceous products without incurring substantial denaturation.

In various embodiments, the method inactivates virus and virus-like particles. In some embodiments, the method inactivates one or more virions associated with the bulk bone tissue. The supercritical fluid is capable of being received by at least one virion and upon removal, causes inactivation of the virion. The method further comprises the step of removing the supercritical fluid from the bulk bone tissue and one or more virions to render one or more virions inactive.

In some embodiments, viral infectious organisms which may be inactivated by the methods described herein include, but are not limited to, the lipid-containing viruses of the following genuses: *Alphavirus* (alphaviruses), *Rubivurus* (rubella virus), *Flavivirus* (Flaviviruses), *Pestivirus* (mucosal disease viruses), (unnamed, hepatitis C virus), *Coronavirus*, (Coronaviruses), *Torovirus*, (toroviruses), *Arteivirus*, (arteriviruses), *Paramyxovirus*, (Paramyxoviruses), *Rubulavirus* (rubulavriuses), *Morbillivirus*(morbillivuruses), *Pneumovirinae* (the pneumoviruses), *Pneumovirus* (pneumoviruses), *Vesiculovirus* (vesiculoviruses), *Lyssavirus* (lyssaviruses), *Ephemerovirus*(ephemeroviruses), *Cytorhabdovirus* (plant rhabdovirus group A), *Nucleorhabdovirus* (plant rhabdovirus group B), *Filovirus* (filoviruses), *Influenzavirus* A, B (*influenza* A and B viruses), *Influenza* virus C (*influenza* C virus), (unnamed, Thogoto-like viruses), *Bunyavirus* (bunyaviruses), *Phlebovirus* (phleboviruses), *Nairovirus* (nairoviruses), *Hantavirus* (hantaviruses), *Tospovirus* (tospoviruses), *Arenavirus* (arenaviruses), unnamed mammalian type B retroviruses, unnamed, mammalian and reptilian type C retroviruses, unnamed type D retroviruses, *Lentivirus* (lentiviruses), *Spumavirus* (spumaviruses), *Orthohepadnavirus* (hepadnaviruses of mammals), *Avihepadnavirus* (hepadnaviruses of birds), *Simplexvirus* (simplexviruses), *Varicellovirus* (varicelloviruses), *Betaherpesvirinae* (the cytomegaloviruses), *Cytomegalovirus* (cytomegaloviruses), *Muromegalovirus* (murine cytomegaloviruses), *Roseolovirus* (human herpes virus 6), *Gammaherpesvirinae* (the lymphocyte-associated herpes viruses), *Lymphocryptovirus* (Epstein-Bar-like viruses), *Rhadinovirus* (saimiri-ateles-like herpes viruses), *Orthopoxvirus* (orthopoxviruses), *Parapoxvirus* (parapoxviruses), *Avipoxvirus* (fowlpox viruses), *Capripoxvirus* (sheeppoxlike viruses), *Leporipoxvirus* (myxomaviruses), *Suipoxvirus* (swine-pox viruses), *Molluscipoxvirus* (molluscum contagiosum viruses), *Yatapoxvirus* (yabapox and tanapox viruses), Unnamed, African swine fever-like viruses, *Iridovirus* (small iridescent insect viruses), *Ranavirus* (front iridoviruses), *Lymphocystivirus* (lymphocystis viruses of fish), *Togaviridae, Flaviviridae, Coronaviridae, Enabdoviridae, Filoviridae, Paramyxoviridae, Orthomyxoviridae, Bunyaviridae, Arenaviridae, Retroviridae, Hepadnaviridae, Herpesviridae, Poxyiridae*, and any other lipid-containing virus.

In various embodiments, these viruses include the following human and animal pathogens: Ross River virus, fever virus, dengue viruses, Murray Valley encephalitis virus, tick-borne encephalitis viruses (including European and far eastern tick-borne encephalitis viruses), human coronaviruses 229-E and OC43 and others (causing the common cold, upper respiratory tract infection, probably pneumonia and possibly gastroenteritis), human parainfluenza viruses 1 and 3, mumps virus, human parainfluenza viruses 2, 4a and 4b, measles virus, human respiratory syncytial virus, rabies virus, Marburg virus, Ebola virus, *influenza* A viruses and *influenza* B viruses, Arenaviruss: lymphocytic choriomeningitis (LCM) virus; Lassa virus, human immunodeficiency viruses 1 and 2, or any other immunodeficiency virus, hepatitis A virus, hepatitis B virus, hepatitis C virus, Subfamily: human herpes viruses 1 and 2, herpes virus B, Epstein-Barr virus), (smallpox) virus, cowpox virus, molluscum contagiosum virus.

All protozoa containing lipid, especially in their plasma membranes, are included within the scope of the present application. In some embodiments, protozoa that may be inactivated by the methods of the present application include, but are not limited to, the following lipid-containing protozoa: *Trypanosoma brucei, Trypanosoma gambiense, Trypanosoma cruzi, Leishmania donovani, Leishmania vianni, Leishmania tropica, Giardia lamblia, Giardia intestinalis; Trichomonas vaginalis, Entamoeba histolytica, Entamoeba coli, Entamoeba hartmanni, Naegleria* species, *Acanthamoeba* species, *Plasmodium falciparum, Plasmodium vivax, Plasmodium malariae, Plasmodium ovale, Toxoplasma gondii, Cryptosporidium parvum, Cryptosporidium muris, Isospora belli, Cyclospora cayetansis, Balantidium* species, *Babesia bovis, Babesia, microti, Babesia divergens, Encephalitozoon intestinalis, Pleistophora* species, *Nosema ocularum, Vittaforma corneae, Septata intestinalis, Enterocytozoon, Dientamoeba fragilis, Blastocystis* species, *Sarcocystis* species, *Pneumocystis carinii, Microsporidium africanum, Microsporidium ceylonensis, Eimeria acervulina, Eimeria maxima, Eimeria tenella* and *Neospora caninum*. It is to be understood that the present application is not limited to the protozoa provided in the list above.

In some embodiments, protozoa treated with methods of the present application is Coccidia, which includes *Isospora* species, *Cryptosporidium* species, *Cyclospora* species, *Toxoplasma* species, *Sarcocystis* species, *Neospora* species, and *Eimeria* species. These coccidian parasites cause intestinal disease, lymphadenopathy, encephalitis, myocarditis, and pneumonitis.

The terms "protozoal infection" or "infectious disease" mean diseases caused by protozoal infectious organisms. The diseases include, but are not limited to, African sleeping sickness, Chagas' disease, Leishmaniasis, Giardiasis, Trichomoniasis, amebiasis, primary amebic encephalitis, granulomatous amebic encephalitis, malaria, Toxoplasmosis, Cryptosporidiosis, Isosporiasis, Cyclosporiasis, Balantidiasis, Babesiosis, microsporidiosis, *Dientamoeba fragilis* infection, *Blastocystis hominis* infection, Sarcosporidiosis, pneumonia, and coccidiosis. In some embodiments, protozoal infection treated with the method of the present application is Coccidiosis, which is caused by *Isospora* species, *Cryptosporidium* species, *Cyclospora* species, *Toxoplasma* species, *Sarcocystis* species, *Neospora* species, and *Eimeria* species. These coccidian parasites cause human intestinal disease, lymphadenopathy, encephalitis, myocarditis, and pneumonitis. These coccidian parasites also cause disease in animals, including cattle, dogs, cats, and birds. Avians, and chickens, turkeys and quail in particular, are affected by Coccidiosis, especially by *Eimeria* species such as *E. acervulina, E. maxima, E. necatrix, E. bruneti, E. mitis, E. praecox* and *E. tenella*.

In various embodiments, the method also depyrogenates the frozen bulk bone tissue. In some embodiments, the supercritical fluid is capable of being received by at least one virion and upon removal, causes inactivation of the virion. The method further comprises the step of removing the supercritical fluid from the material and one or more virions to render one or more virions inactive.

In some embodiments, the method also reduces the bioburden on the surface of bulk bone tissue. In various embodiments, the supercritical fluid is applied to the bulk bone tissue (e.g., dry lyophilized bone) and acts as a bioburden reduction process while maintaining most of the proteins intact in the bulk bone tissue. In various embodiments, the supercritical fluid is applied to the bulk bone tissue (e.g., frozen bulk bone tissue) and acts as a bioburden reduction process while maintaining or not maintaining the proteins intact in the bulk bone tissue. In some embodiments, the bioburden may be reduced from about 1-log to about 10-log reduction in CFUs when subjecting the bulk bone tissue to the supercritical fluid. In some embodiments, the log reduction of subjecting the bulk bone tissue to the supercritical fluid is a 1, 2, 3, 4, 5, 6, 7, 8, 9 or 10-log reduction.

Multiple Cycles

In some embodiments, a single, all-in-one method is provided that incorporates the methods described above, and comprises multiple cycles and/or sequences/phases to remove/destroy contaminants from the frozen bulk bone tissue. The single method dries, sterilizes, cleans, delipidates and/or virally inactivates the frozen bulk bone tissue. In some embodiments, the single method incorporates the features above and comprises a low temperature/pressure phase for drying, a medium temperature/pressure phase for delipidation, a high temperature/pressure phase for sterilization, cleaning and viral inactivation. In some embodiments, multiple cycles and/or sequences/phases will help delipidation and drying of the frozen bulk bone tissue. In various embodiments, the temperature and pressure can increase or decrease in a controlled manner for optimal drying, sterilization, cleaning, delipidating and/or virally inactivating.

Providing Frozen Bulk Bone Tissue

The methods in this application apply broadly to bulk bone tissue obtained from multiple sources. In various embodiments, in xenogenic implantation in a human subject, bulk bone tissue can be obtained from animal sources such as cows and pigs. In other embodiments, in allogenic implantation in a human subject, bulk bone tissue is obtained from human cadavers, following appropriate ethical and legal requirements. Such human bulk bone tissue is available from a variety of tissue banks.

The bulk bone tissue may comprise cortical bone, cancellous bone, or a combination thereof. Cancellous bone is available in a range of porosities based on the location in the body from which the bone is harvested. Highly porous cancellous bone may be harvested from various areas such as the iliac crest, while less porous bone may be harvested from areas such as the tibial condyle femoral head, and calcaneus. Cortical bone may be obtained from long bones, such as the diaphyseal shaft of the femur and tibia. In certain embodiments, the bone comprises cortical bone.

Depending on the desired end-use of the bulk bone tissue, the bulk bone tissue may be subjected to mechanical processing. Such processing may include cutting and shaping, in embodiments forming a construct such as a bone pin or disk for implanting. In one embodiment, the bulk bone tissue comprises a bone powder. In such an embodiment, the bulk bone tissue is initially ground to a selected size. In one embodiment, the bone particulates are less than about 1500 microns in size, less than about 2000 microns in size and/or less than 2250 microns in size. In various embodiments, the bone particles range from about 50 microns to about 1000 microns, from about 75 to about 800 microns, from about 150 to about 600 microns or from about 225 to 400. Depending on the desired composition, particles may be of a variety of sizes. In some embodiments, the bone particles are 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1760, 1770, 1780, 1790, 1800, 1810, 1820, 1830, 1840, 1850, 1860, 1870, 1880, 1890, 1900, 1910, 1920, 1930, 1940, 1950, 1960, 1970, 1980, 1990, 2000, 2010, 2020, 2030, 2040, 2050, 2060, 2070, 2080, 2090, 2100, 2110, 2120, 2130, 2140, 2150, 2160, 2170, 2180, 2190, 2200, 2210, 2220, 2230, 2240 and/or 2250 microns.

In some embodiments, the bulk bone tissue comprises a bone matrix. In various embodiments, biological activities of the bone matrix may be increased. Accordingly, the bone matrix, and compositions formed from the bone matrix, may variously be referred to as biologically active and/or, in some cases, osteoinductive. The biological activities of the bulk bone tissue provided herein that may be increased include but are not limited to osteoinductive activity, osteogenic activity, chondrogenic activity, wound healing activity, neurogenic activity, contraction-inducing activity, mitosis-inducing activity, differentiation-inducing activity, chemotactic activity, angiogenic or vasculogenic activity, exocytosis or endocytosis-inducing activity, or other cell or biological activity. It will be appreciated that bone formation processes frequently include a first stage of cartilage formation that creates the basic shape of the bone, which then becomes mineralized (endochondral bone formation). Thus, in many instances, chondrogenesis may be considered an early stage of osteogenesis, though of course it may also occur in other contexts.

Providing Bone Particles

The bulk bone tissue may be derived from any vertebrate. In certain embodiments, the source of the bulk bone tissue can be matched to the eventual recipient of the bulk bone tissue (e.g., the donor and recipient should, at least, be of the same species). For example, human bone-derived material is typically used in a human subject. In other embodiments, the bulk bone tissue is obtained from bone of xenogenic origin. Porcine bone and bovine bone are particularly advantageous types of xenogenic bulk bone tissue that can be used individually or in combination as sources for the bone particles. Xenogenic bulk bone tissue may be combined with allogenic or autogenous bone.

Methods for the preparation of bone particles are known in the art. Bone particles can be formed by milling whole bone to produce fibers, chipping whole bone, cutting whole bone, fracturing whole bone in liquid nitrogen, or otherwise disintegrating the bulk bone tissue. In certain embodiments, particles are sieved to produce particles of a specific size range. Bone particles may be of any shape or size. Exemplary shapes include spheroidal, plates, fibers, cuboidal, sheets, rods, oval, strings, elongated particles, wedges, discs, rectangular, polyhedral. In some embodiments, bone particles may be between about 10 microns and about 1000 microns in diameter or more. In some embodiments, particles may be between about 20 microns and about 800 microns in diameter or more. In certain embodiments, the particles range in size from approximately 100 microns in diameter to approximately 500 microns in diameter. In certain embodiments, the particles range in size from approximately 300 microns in diameter to approximately 800 microns in diameter. As for irregularly shaped particles, the recited dimension ranges may represent the length of the greatest or smallest dimension of the particle.

In certain embodiments, the bone-derived particles are used "as is" in preparing a composite. In other embodiments, the bone-derived particles are modified before composite preparation. Thus, for example, bone particles suitable for use in the methods of the present application can be demineralized, non-demineralized, mineralized/deorganified, or anorganic bone particles.

Providing Demineralized Bulk Bone Tissue

In some embodiments, following shaving, milling or other technique whereby they are obtained, the bulk bone tissue is subjected to demineralization in order to reduce its inorganic content to a very low level, in some embodiments, to not more than about 5% by weight of residual calcium and no more than about 1% by weight of residual calcium. Demineralization of the bulk bone tissue ordinarily results in its contraction to some extent.

In some embodiments, bulk bone tissue used in the methods described herein may be autograft, allograft, or xenograft. In various embodiments, the bulk bone tissue may be cortical bone, cancellous bone, or cortico-cancellous bone. While specific discussion is made herein to bulk bone tissue comprising demineralized bone matrix, bone matrix treated in accordance with the teachings herein may be non-demineralized, demineralized, partially demineralized, or surface demineralized. The following discussion applies to demineralized, partially demineralized, and surface demineralized bone matrix. In one embodiment, the demineralized bone is sourced from bovine or human bone. In another embodiment, demineralized bone is sourced from human bone. In one embodiment, the demineralized bone is sourced from the patient's own bone (autogenous bone). In another embodiment, the demineralized bone is sourced from a different animal (including a cadaver) of the same species (allograft bone).

Any suitable manner of demineralizing the bone may be used. Demineralization of the bulk bone tissue can be conducted in accordance with known conventional procedures. For example, in some embodiments, the bulk bone tissue is subjected to an acid demineralization step that is followed by a defatting/disinfecting step. The bulk bone tissue is immersed in acid over time to effect its demineralization. Acids which can be employed in this step include inorganic acids such as hydrochloric acid and organic acids such as peracetic acid, acetic acid, citric acid, or propionic acid. The depth of demineralization into the bone surface can be controlled by adjusting the treatment time, temperature of the demineralizing solution, concentration of the demineralizing solution, agitation intensity during treatment, and other applied forces such as vacuum, centrifuge, pressure, and other factors such as known to those skilled in the art. In some embodiments, the defatting/disinfecting step can be accomplished by the method of delipidation/terminal sterilization utilizing contacting the bulk bone tissue with supercritical fluid as described in this application. Thus, in various embodiments, the bulk bone tissue may be fully demineralized, partially demineralized, or surface demineralized.

In various embodiments, after acid treatment, the bone is rinsed with sterile water for injection, buffered with a buffering agent to a final predetermined pH and then finally rinsed with water for injection to remove residual amounts of acid and buffering agent or washed with water to remove residual acid and thereby raise the pH. In some embodiments, following demineralization, the bulk bone tissue is immersed in solution to effect its defatting. In some embodiments, the demineralized bulk bone tissue can be frozen immediately or it can be stored under aseptic conditions, for example, in a critical point dried state prior to such preparation. In some embodiments, the bulk bone tissue can retain some of its original mineral content such that the composition is rendered capable of being imaged utilizing radiographic techniques.

In some embodiments, the bulk bone tissue is particulated. If the bulk bone tissue is demineralized, the bulk bone tissue may be particulated before, during or after demineralization. In various embodiments, the bulk bone tissue may be monolithic and may not be particulated. Accordingly, while specific discussion is given to particulating bone, the methods disclosed herein and the nanoscale textured surfaces disclosed herein may be used with monolithic bones or implants, including, for example, surface demineralized implants or fully demineralized cortical bone implants.

In some embodiments, the bulk bone tissue may be milled and ground or otherwise processed into particles of an appropriate size before or after demineralization. The particles may be particulate or fibrous. The terms milling or grinding are not intended to be limited to production of particles of a specific type and may refer to production of particulate or fibrous particles. In certain embodiments, the particle size may be greater than 75 microns, such as ranging from about 100 to about 3000 microns, or from about 200 to about 2000 microns. After grinding, the bone particles may be sieved to select those particles of a desired size. In certain embodiments, the particles may be sieved though a 50 micron sieve, a 75 micron sieve, or a 100 micron sieve.

In yet a further embodiment, monolithic bone is demineralized and particulated before drying. Accordingly, the bone may be demineralized in monolithic pieces. The demineralized monolithic pieces may then be milled in a wet condition and critical point dried, for example using carbon dioxide as a medium.

In some embodiments, monolithic bone is demineralized and dried before particulating (if done). Accordingly, the bone may be demineralized in monolithic pieces. The bone is pressed in a wet condition and then critical point dried, for example using carbon dioxide as a medium. In alternatives of this embodiment, the demineralized and dried monolithic bone is not particulated and is processed as a monolithic implant.

In various embodiments, the bulk bone tissue is then frozen. In some embodiments, the bulk bone tissue is frozen at a particular temperature such as, for example, at a temperature from about −20° C. to about −70° C. In various embodiments, the bulk bone tissue is frozen at a particular temperature such as, for example, at −20, −21, −22, −23, −24, −25, −26, −27, −28, −29, −30, −31, −32, −33, −34, −35, −36, −37, −38, −39, −40, −41, −42, −43, −44, −45, −46, −47, −48, −49, −50, −51, −52, −53, −54, −55, −56, −57, −58, −59, −60, −61, −62, −63, −64, −65, −66, −67, −68, −69 or −70° C.

Providing Demineralized Bone Matrix

In various embodiments, the bulk bone tissue comprises demineralized bone matrix which comprises fibers. DBM includes the collagen matrix of the bone together with acid insoluble proteins including bone morphogenic proteins (BMPs) and other growth factors. It can be formulated for use as granules, gels, sponge material or putty and can be freeze-dried for storage. DBM provides an initial osteoconductive matrix and exhibits a degree of osteoinductive potential, inducing the infiltration and differentiation of osteoprogenitor cells from the surrounding tissues.

DBM preparations have been used for many years in orthopedic medicine to promote the formation of bone. For example, DBM has found use in the repair of fractures, in the fusion of vertebrae, in joint replacement surgery, and in treating bone destruction due to underlying disease such as rheumatoid arthritis. DBM is thought to promote bone formation in vivo by osteoconductive and osteoinductive processes. The osteoinductive effect of implanted DBM compositions is thought to result from the presence of active growth factors present on the isolated collagen-based matrix. These factors include members of the TGF-β, IGF, and BMP protein families. Particular examples of osteoinductive factors include TGF-3, IGF-1, IGF-2, BMP-2, BMP-7, parathyroid hormone (PTH), and angiogenic factors. Other osteoinductive factors such as osteocalcin and osteopontin are also likely to be present in DBM preparations as well. There are also likely to be other unnamed or undiscovered osteoinductive factors present in DBM.

In various embodiments, the DBM provided in the methods described herein is prepared from elongated bone fibers. In some embodiments, the elongated bone fibers have relatively high average length to average width ratios, also known as the aspect ratio. In various embodiments, the aspect ratio of the elongated bone fibers is at least from about 50:1 to about at least about 1000:1. In some embodiments, the elongated bone fibers are formed obtained by milling or shaving the surface of an entire bone or a relatively large section of bone.

In other embodiments, the length of the fibers can be at least about 3.5 cm and average width from about 20 mm to about 1 cm. In various embodiments, the average length of the elongated fibers can be from about 3.5 cm to about 6.0 cm and the average width from about 20 mm to about 1 cm. In other embodiments, the elongated fibers can have an average length be from about 4.0 cm to about 6.0 cm and an average width from about 20 mm to about 1 cm.

In yet other embodiments, the diameter or average width of the elongated fibers is, for example, not more than about 1.00 cm, not more than 0.5 cm or not more than about 0.01 cm. In still other embodiments, the diameter or average width of the fibers can be from about 0.01 cm to about 0.4 cm or from about 0.02 cm to about 0.3 cm.

In another embodiment, the aspect ratio of the fibers can be from about 50:1 to about 950:1, from about 50:1 to about 750:1, from about 50:1 to about 500:1, from about 50:1 to about 250:1; or from about 50:1 to about 100:1. In some embodiments, the aspect ratio of the elongated bone fibers is from about 50:1 to about 1000:1, from about 50:1 to about 950:1, from about 50:1 to about 750:1, from about 50:1 to about 600:1, from about 50:1 to about 350:1, from about 50:1 to about 200:1, from about 50:1 to about 100:1, or from about 50:1 to about 75:1.

In various embodiments, to prepare the osteogenic DBM, a quantity of fibers is combined with a biocompatible carrier to provide a demineralized bone matrix.

Providing Optional Additives

In various embodiments, the bulk bone tissue can be modified. In some embodiments, any of a variety of medically and/or surgically useful optional substances can be incorporated in, or associated with, the bulk bone tissue before, during, or after the bulk bone tissue has been treated with the supercritical fluid. In some embodiments, one or more of such substances can be introduced into the bulk bone tissue, for example, by soaking or immersing the bulk bone tissue in a solution or dispersion of the desired substance(s), by adding the substance(s) directly to the bulk bone tissue.

Medically/surgically useful substances which can be readily combined with the bulk bone tissue, include, for example, collagen, insoluble collagen derivatives, hydroxyapatite, and soluble solids and/or liquids dissolved therein, for example, antiviricides, particularly those effective against HIV and hepatitis; antimicrobials and/or antibiotics such as erythromycin, bacitracin, neomycin, penicillin, polymyxin B, tetracyclines, viomycin, chloromycetin and streptomycins, cefazolin, ampicillin, azactam, tobramycin, clindamycin and gentamycin; amino acids, peptides, vitamins, inorganic elements, inorganic compounds, cofactors for protein synthesis, hormones; endocrine tissue or tissue fragments; synthesizers; enzymes such as collagenase, peptidases, oxidases; polymer cell scaffolds with paraenchymal cells; angiogenic drugs and polymeric carriers containing such drugs; collagen lattices; biocompatible surface active agents; antigenic agents; cytoskeletal agents; cartilage fragments, living cells such as chondrocytes, bone marrow cells, mesenchymal stem cells, natural extracts, tissue transplants, bioadhesives, bone morphogenic proteins (BMPs), transforming growth factor (TGF-beta), insulin-like growth factor (IGF-1) (IGF-2), platelet derived growth factor (PDGF), fibroblast growth factors (FGF), vascular endothelial growth factor (VEGF), angiogenic agents, bone promoters, cytokines, interleukins, genetic material, genes encoding bone promoting action, cells containing genes encoding bone promoting action; growth hormones such as somatotropin; bone digestors; antitumor agents; fibronectin; cellular attractants and attachment agents; immunosuppressants; permeation enhancers, for example, fatty acid esters such as laureate, myristate and stearate monesters of polyethylene glycol, surface active agents, enamine derivatives, α-keto aldehydes; nucleic acids; epidermal growth factor (EGF); all collagen types (not just type 1); non-collagenous proteins such as osteopontin, osteonectine, bone sialo proteins, vitronectin, thrombospondin, proteoglycans, decorin, biglycan, aggrecan, versican, tenascin, matrix gla protein hyaluronan; soluble and insoluble components of the immune system, soluble and insoluble receptors including truncated forms, soluble, insoluble and cell surface bound ligands including truncated forms; chemokines, bioactive compounds that are endocytosed; compounds capable of altering the membrane potential of cells, compounds capable of altering the monovalent and divalent cation/anion channels of cells; bone resorption inhibitors and stimulators; angiogenic and mitogenic factors; bioactive factors that inhibit and stimulate second messenger molecules; integrin adhesion molecules; clotting factors; externally expanded autograft or xenograft cells and any combinations thereof. The amounts of such optionally added substances can vary widely with optimum levels being readily determined in a specific case by routine experimentation.

In some embodiments, the bulk bone tissue comprises a number of materials in combination, some or all of which may be in the form of fibers and/or particles. In some embodiments, the bulk bone tissue comprises calcium phosphates. Driessens et al. "Calcium phosphate bone cements," Wise, D. L., Ed., Encyclopedic Handbook of Biomaterials and Bioengineering, Part B, Applications New York: Marcel Decker; Elliott, Structure and Chemistry of the Apatites and Other Calcium Phosphates Elsevier, Amsterdam, 1994, each of which is incorporated by reference. Calcium phosphate matrices include, but are not limited to, dicalcium phosphate dihydrate, monetite, tricalcium phosphate, tetracalcium phosphate, hydroxyapatite, nanocrystalline hydroxyapatite, poorly crystalline hydroxyapatite, substituted hydroxyapatite, and calcium deficient hydroxyapatites. In some embodiments, the bulk bone tissues may be added to a carrier before or after being treated with the supercritical fluid.

In some embodiments, the bulk bone tissue may be further treated to affect properties of bone. For example, in some embodiments, the bulk bone tissue comprises DBM and may be treated to disrupt the collagen structure of the DBM. Such treatment may comprise collagenase treatment, heat treatment, mechanical treatment, or other. While DBM is specifically discussed herein, in some embodiments, the teachings herein may be applied to non-demineralized bone, to partially demineralized bone, or to surface demineralized bone.

In some embodiments, biological activities of the bulk bone tissue may be increased. Accordingly, the bulk bone tissue, and compositions formed from the bulk bone tissue, may variously be referred to as biologically active and/or, in some cases, osteoinductive. The biological activities of the bulk bone tissue provided herein that may be increased include but are not limited to osteoinductive activity, osteogenic activity, chondrogenic activity, wound healing activity, neurogenic activity, contraction-inducing activity, mitosis-inducing activity, differentiation-inducing activity, chemotactic activity, angiogenic or vasculogenic activity, exocytosis or endocytosis-inducing activity, or other cell or biological activity. It will be appreciated that bone formation processes frequently include a first stage of cartilage formation that creates the basic shape of the bone, which then becomes mineralized (endochondral bone formation). Thus, in many instances, chondrogenesis may be considered an early stage of osteogenesis, though of course it may also occur in other contexts.

In various embodiments, the bulk bone tissue is used with growth factors, extracts, peptide hormones, or other additives to increase the osteoinductive capacity or that otherwise encourage cell or biological activity of the bulk bone tissue or to impart other benefits to the bulk bone tissue. It will be appreciated that the amount of additive used will vary depending upon the type of additive, the specific activity of the particular additive preparation employed, and the intended use of the composition. The desired amount is readily determinable by the user.

Any of a variety of medically and/or surgically useful optional substances can be incorporated in, or associated with, the osteoinductive factors either before, during, or after preparation of the osteoinductive or biologically active bulk bone tissue. Thus, for example, when demineralized bone fibers are used to form the bulk bone tissue, one or more of such substances may be introduced into the demineralized bone fibers, by soaking or immersing these bone fibers in a solution or dispersion of the desired substance(s).

In one embodiment, a tissue-derived extract may be added to the bulk bone tissue. U.S. published patent application No. 2009/0130173 discloses such extracts and addition of such extracts to DBM and is incorporated herein by reference. For example, a tissue-derived extract or partially demineralized bone may be added to the bulk bone tissue. The extract may be derived from any suitable tissue, such as bone, bladder, kidney, brain, skin, or connective tissue. Further, the extract may be derived in any suitable manner. The extract may be allogeneic, autogeneic, xenogeneic, or transgenic. In embodiments wherein the extract is bone-derived, the bone may be cortical, cancellous, or cortico-cancellous and may be demineralized, partially demineralized, or mineralized. In some embodiments, the extract may comprise demineralized bone, partially demineralized bone, mineral derived from bone, or collagen derived from bone. In some embodiments, the tissue-derived extract may be a protein extract.

Bone regeneration involves a multitude of cells, for example, cartilage, fibroblasts, endothelial cells besides osteoblasts. Accordingly, in some embodiments, the bulk bone tissue may be used to deliver stem cells, which offers the potential to give rise to different types of cells in the bone repair process. In one embodiment, the bulk bone tissue further comprises a cell such as an osteogenic cell or a stem cell.

In various embodiments, the additive may comprise radiopaque substances, angiogenesis promoting materials, bioactive agents, osteoinducing agents, or other. In some embodiments, such materials would include without limitation barium sulfate, iodine-containing compounds, titanium and mineralized bone.

In various embodiments, the additive is adsorbed to or otherwise associated with the bulk bone tissue. The additive may be associated with the bulk bone tissue through specific or non-specific interactions, or covalent or noncovalent interactions. Examples of specific interactions include those between a ligand and a receptor, an epitope or an antibody. Examples of nonspecific interactions include hydrophobic interactions, electrostatic interactions, magnetic interactions, dipole interactions, van der Waals interactions, or hydrogen bonding. In certain embodiments, the additive is attached to the bulk bone tissue, for example, to a carrier, using a linker so that the additive is free to associate with its receptor or site of action in vivo. In other embodiments the additive is either covalently or non-covalently attached to a carrier. In some embodiments, the additive may be attached to a chemical compound such as a peptide that is recognized by a carrier. In another embodiment, the additive is attached to an antibody, or fragment thereof, that recognizes an epitope found within the carrier. In certain embodiments at least additives are attached to an osteoimplant. In other embodiments at least three additives are attached to the osteoinductive or biologically active carrier. An additive may be provided within an osteoinductive or biologically active carrier in a sustained release format. For example, the additive may be encapsulated within biodegradable polymer nanospheres, or microspheres.

In various embodiments, an additive is included in the bulk bone tissue to further modify the handling characteristics of the bulk bone tissue, such as viscosity and moldability. The additive may be a biocompatible polymer, such as a water-soluble cellulosic, or a natural polymer, such as gelatin. The additive may be added to either a dry bulk bone tissue or a liquid component that the bulk bone tissue is later added to. In some embodiments, the additive may be used to at least partially coat the bulk bone tissue prior to combining the bulk bone tissue with a liquid carrier. Non-limiting examples of additives suitable for use with the bulk bone tissue include, but are not limited to, gelatin, carboxymethyl cellulose, hydroxypropyl methylcellulose, methylcellulose, hydroxyethyl cellulose, other cellulose derivatives, alginate, hyaluronic acid, sodium salts, polyvinyl pyrrolidones, polyvinyl alcohol, arabic gum, guar gum, xantham gum, chitosans, and poloxamers.

In some embodiments, the bulk bone tissue is freshly prepared and disposed within a carrier by mixing desired quantities of the bulk bone tissue, a fluid and/or a solid carrier and optional component(s), if any, in any suitable sequence of separate mixing, adsorption, rehydration or drying operations or all at once. Thus, in some embodiments, the bulk bone tissue treated by the supercritical fluid described herein, can be mixed with the optional ingredients(s) and thereafter combined with a fluid and/or a solid carrier component; the bulk bone tissue can be mixed with a fluid and/or a solid carrier followed by addition of the optional ingredient(s); or the optional ingredients can be added to a fluid and/or a solid carrier followed by addition of the bulk bone tissue. Variations of these and other sequences of mixing are, of course, possible. In various embodiments, the bulk bone tissue comprises non-fibrous bone elements. In other embodiments, the fibrous elements and a fluid and/or a solid carrier are mixed substantially simultaneously such that the fibrous elements of the bulk bone tissue are entangled and the non-fibrous bone elements are thoroughly mixed in the entangled fibrous bone elements.

In various embodiments, when the bulk bone tissue contains elongated fibers which have been critically point dried, the resulting bulk bone tissue also contains enhanced osteoconductivity. Elongated fibers treated with the supercritical fluid described herein, are naturally more osteoconductive than non-fibrous elements, as cells, for example, osteoclasts and osteoblasts, can travel along the length of the fiber farther and with greater orientation to gain access to the composite interior of the bulk bone tissue. The entangled fiber network provides a continuous pathway for improved cellular access over the fibers of implantable composition utilized in the bulk bone tissue and as a result an improvement in osteoconductivity is, therefore, expected.

In various embodiments, the bulk bone tissue treated with the supercritical fluid can be tailored to be utilized for a variety of orthopaedic, neurosurgical, and/or oral and maxillofacial surgical indications in which it would be advantageous to be able to firmly place the bulk bone tissue into a bone defect site such as the repair of simple and compound fractures and nonunions, external fixations, joint reconstructions such as arthrodesis, general arthroplasty, acetabular repair, cup arthroplasty of the hip, femoral and humeral head replacement, femoral head surface replacement and total joint replacements, repairs of the vertebral column including spinal fusion and internal fixation, tumor surgery, for example, deficit filling, discectomy, laminectomy, excision of spinal cord tumors, anterior cervical and thoracic operations, repair of spinal injuries, scoliosis, lordosis and kyphosis treatments, intermaxillary fixation of fractures, mentoplasty, temporomandibular joint replacement, alveolar ridge augmentation and reconstruction, inlay bone grafts, implant placement and revision, sinus lifts, furcation defects, periodontal defects, dental defects, ulna defects, metaphyseal defects, tibia plateau defects, wrist defects, ankle defects, and the like.

In some embodiments, the bulk bone tissue is stored in packaging. In some embodiments, the packaging is a polytyvek (e.g., flashspun high-density polyethylene fibers) pouch or a tyvek-tyvek pouch.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of drying frozen bulk bone tissue, the method comprising: contacting frozen bulk bone tissue with a supercritical fluid so as to dry the frozen bulk bone tissue, wherein the frozen bulk bone tissue has a length from about 1 cm to about 55 cm and the frozen bulk bone tissue has a thickness from about 1 cm to about 25 cm, and the frozen bulk bone tissue is at least 90% substantially pure and the method preserves the three dimensional structure of the frozen bulk bone tissue.

2. A method of drying frozen bulk bone tissue of claim 1, wherein the supercritical fluid comprises supercritical carbon dioxide, water, methane, ethane, propane, ethylene, propylene, methanol, ethanol or acetone.

3. A method of drying frozen bulk bone tissue of claim 1, wherein the supercritical fluid is supercritical carbon dioxide.

4. A method of drying frozen bulk bone tissue of claim 1, wherein the contacting step comprises contacting the frozen bulk bone tissue with the supercritical fluid for a period of time and returning the supercritical fluid to a non-supercritical state.

5. A method of drying frozen bulk bone tissue of claim 4, wherein the supercritical fluid contacts the frozen bulk bone tissue from about 5 minutes to about 8 hours.

6. A method of drying frozen bulk bone tissue of claim 4, wherein the supercritical fluid contacts the frozen bulk bone tissue from about 1 to about 2 hours.

7. A method of drying frozen bulk bone tissue of claim 4, wherein the supercritical fluid is at a pressure from about 50 bar to about 800 bar and at a temperature from about 31.0° C. to about 150° C.

8. A method of drying frozen bulk bone tissue of claim 1, wherein the frozen bulk bone tissue is frozen at temperature of about −20° C. to about −70° C.

9. A method of drying frozen bulk bone tissue of claim 1, wherein the frozen bulk bone tissue is (i) mineralized bone, demineralized bone, partially demineralized bone, fully demineralized bone, surface demineralized bone, mineralized bone matrix, demineralized bone matrix, partially demineralized bone matrix, fully demineralized bone matrix, surface demineralized bone matrix or combinations thereof; (ii) the frozen bulk bone tissue is derived from tendon, cartilage, meniscus or hard bone; and (iii) the frozen bulk bone tissue comprises segments, shafts, particulates, fibers, chips or rods.

10. A method of drying frozen bulk bone tissue of claim 1, wherein the method further comprises cleaning, delipidating, viral inactivating and sterilizing the frozen bulk bone tissue so as to destroy contaminants.

11. A method of drying frozen bulk bone tissue of claim 10, wherein the contaminants comprises lipids, viruses, bacteria, pyrogens, prions, micro-organisms or pathogens.

12. A method of drying frozen bulk bone tissue of claim 10, wherein the supercritical fluid causes (i) a 3-log reduction of bacteria within the frozen bulk bone tissue; (ii) a 4-log reduction of bacteria within the frozen bulk bone tissue; (iii) a 5-log reduction of bacteria within the frozen bulk bone tissue; or (iv) a 6-log reduction of bacteria within the frozen bulk bone tissue.

13. A method of drying frozen bulk bone tissue of claim 1, wherein the supercritical fluid is at a reduced temperature from about 0.1 to about 2.0.

14. A method of drying and sterilizing frozen bulk bone tissue, the method comprising: contacting frozen bulk bone tissue with a supercritical fluid so as to dry and sterilize the frozen bulk bone tissue, wherein the frozen bulk bone tissue has a length from about 1 cm to about 55 cm and the frozen bulk bone tissue has a thickness from about 1 cm to about 25 cm, and the frozen bulk bone tissue is 99.9% substantially pure and the method preserves the three dimensional structure of the frozen bulk bone tissue.

15. A method of drying and sterilizing frozen bulk bone tissue of claim 14, wherein the contacting comprises contacting the frozen bulk bone tissue with the supercritical fluid at a pressure from about 50 bar to about 800 bar at a temperature from about 31.0° C. to about 150° C. for a period of 1 to 2 hours; and returning the supercritical fluid to a non-supercritical state.

16. A method of drying and sterilizing frozen bulk bone tissue of claim 14, wherein the frozen bulk bone tissue is obtained from cortical autogenic, cortical allogenic, cortical xenogenic cancellous autogenic, cancellous allogenic, cancellous xenogenic, cortical transgenic, cancellous transgenic, corticocancellous autogenic, corticocancellous allogenic, corticocancellous xenogenic or corticocancellus transgenic bone.

17. A method of drying, sterilizing and cleaning frozen bulk bone tissue, the method comprising: contacting frozen bulk bone tissue with a supercritical fluid so as to dry, sterilize and clean the frozen bulk bone tissue, wherein the frozen bulk bone tissue has a length from about 1 cm to about 55 cm and the frozen bulk bone tissue has a thickness from about 1 cm to about 25 cm, and the frozen bulk bone tissue is 99.9% substantially pure and the method preserves the three dimensional structure of the frozen bulk bone tissue.

18. A method of drying, sterilizing and cleaning bulk bone tissue of claim 17, wherein the bulk bone tissue is frozen and (i) the supercritical fluid comprises carbon dioxide; (ii) the contacting comprises contacting with supercritical fluid the frozen bulk bone tissue at a pressure from about 50 bar to about 800 bar and at a temperature from about 31.0° C. to about 150° C. for a period of 1 to 2 hours; and (iii) the frozen bulk bone tissue is 99.9% substantially pure after being treated with the supercritical fluid.

* * * * *